United States Patent
Yen et al.

(10) Patent No.: US 7,676,009 B2
(45) Date of Patent: Mar. 9, 2010

(54) METHOD AND CIRCUIT FOR EQUALIZING AND COMPENSATING IQ IMBALANCE SIMULTANEOUSLY

(75) Inventors: Kuang-Yu Yen, Tai-Chung (TW); Chien-Liang Tsai, Taipei Hsien (TW); Yi-Lin Li, Kao-Hsiung (TW); Hou-Wei Lin, Taipei (TW)

(73) Assignee: Realtek Semiconductor Corp., HsinChu (TW)

( * ) Notice: Subject to any disclaimer, the term of this patent is extended or adjusted under 35 U.S.C. 154(b) by 925 days.

(21) Appl. No.: 11/279,569

(22) Filed: Apr. 13, 2006

(65) Prior Publication Data

US 2006/0233231 A1    Oct. 19, 2006

(30) Foreign Application Priority Data

Apr. 14, 2005    (TW) .............................. 94111842 A

(51) Int. Cl.
*H04B 1/10* (2006.01)
*H03K 5/159* (2006.01)

(52) U.S. Cl. ...................................... 375/350; 375/232

(58) Field of Classification Search ................. 375/136, 375/148, 229, 230, 232–235, 316, 322, 327, 375/332, 346, 347, E7.173, 144, 147, 261, 375/298, 350; 455/91, 117, 118, 324; 329/304, 329/307, 308; 333/12, 15–16, 18; 342/151; 340/379; 379/398; 348/700–701, 706, 710, 348/720, 726

See application file for complete search history.

(56) References Cited

U.S. PATENT DOCUMENTS

| | | | | |
|---|---|---|---|---|
| 6,442,217 | B1 * | 8/2002 | Cochran | 375/326 |
| 6,504,884 | B1 * | 1/2003 | Zvonar | 375/346 |
| 2003/0045249 | A1 | 3/2003 | Nielsen | |
| 2003/0123534 | A1 | 7/2003 | Tsui | |
| 2003/0231726 | A1 * | 12/2003 | Schuchert et al. | 375/350 |
| 2004/0001541 | A1 * | 1/2004 | Haghighat | 375/232 |
| 2005/0036572 | A1 * | 2/2005 | Muhammad et al. | 375/322 |
| 2005/0152476 | A1 * | 7/2005 | Coersmeier | 375/322 |
| 2005/0180534 | A1 * | 8/2005 | Brotje et al. | 375/350 |
| 2006/0013296 | A1 * | 1/2006 | Carrer et al. | 375/232 |
| 2006/0013590 | A1 * | 1/2006 | Hueda et al. | 398/149 |
| 2006/0013597 | A1 * | 1/2006 | Crivelli et al. | 398/208 |
| 2006/0056554 | A1 * | 3/2006 | Lin et al. | 375/350 |
| 2006/0203901 | A1 * | 9/2006 | Tan et al. | 375/233 |
| 2006/0233231 | A1 * | 10/2006 | Yen et al. | 375/233 |
| 2007/0230638 | A1 * | 10/2007 | Griniasty | 375/347 |

OTHER PUBLICATIONS

Yom et al., A 55 Mbaud single Chip Complex Adaptive Transversal Equalizer For Digital Wireless Communications Systems, 1997, Proceedings of the IEEE, pp. 151-154.*

(Continued)

*Primary Examiner*—Tesfaldet Bocure
*Assistant Examiner*—Lawrence B Williams
(74) *Attorney, Agent, or Firm*—Winston Hsu

(57) ABSTRACT

The present invention provides a method and circuit for equalizing and compensating IQ imbalance at the same time. The method includes: down-converting an RF signal to generate a baseband signal, and driving an adaptive equalizer to process the baseband signal for achieving equalization and IQ imbalance compensation simultaneously.

16 Claims, 3 Drawing Sheets

OTHER PUBLICATIONS

Reeve, H. C., Transversal Equalizer for Digital Radios, Nov. 27-30, 1989, Globecom 1989, Conference Proceedings, vol. 1, pp. 11.7.1-11.7.5.*

Yom et al., A 55 Mbaud Single Chip Complex Adaptive Transversal Equalizer For Digital Wireless Communications Systems, 1997, Proceedings of the IEEE, pp. 151-154.*

Reeve, H. C., Transversal Equalizer For Digital Radios, Nov. 27-30, 1989, Globecom 1989, Conference Proceedings, vol. 1, pp. 11.7.1-11.7.5.*

Harris, F., Digital Filter Equalization of Analog Gain and Phase Mismatch in IQ Receivers, Sep. 29-Oct. 2, 1996, Universal Personal Communications, 1996, Record., 1996 5th IEEE International Conference on, vol. 2, pp. 793-796.*

"Least-Mean-Square Adaptive Filters.", pp. 230-247, Chapter 6.

* cited by examiner

METHOD AND CIRCUIT FOR EQUALIZING AND COMPENSATING IQ IMBALANCE SIMULTANEOUSLY

BACKGROUND OF THE INVENTION

1. Field of the Invention

The present invention relates to a signal processing method and the circuit thereof, especially to a method and a circuit for equalizing and compensating IQ imbalance simultaneously.

2. Description of the Prior Art

In communication systems, a carrier is frequently utilized to carry baseband signals that contain data. Generally, a carrier is a high frequency signal. After receiving a radio frequency signal, a receiver initially down converts the radio frequency for the convenience of further process. Recently, due to manufacturing progress and consideration of cost reduction issues, more and more RF circuits in the receiving end have adopted direct down conversion to directly down convert the radio frequency signals into baseband signals. In general, a transmitter adopts a modulation scheme with high bandwidth efficiency because of the bandwidth limitation. A quadrature amplitude modulation (QAM) is a frequently utilized modulation scheme, especially in the cases where a high-resolution digital television signal is transmitted. In such a case, a 256 QAM modulation scheme is often adopted.

When the front end of a receiving terminal adopts an RF front end that utilizes direct down conversion, an IQ imbalance issue is frequently introduced. The IQ imbalance results in the interfering of the function of a QAM receiver. As a result, the receiving end can be equipped with an IQ imbalance compensation circuit for compensating the received radio frequency signal that possesses an IQ imbalance problem caused by direct down conversion. In addition, a channel is generally accompanied by a multi-path issue in the transmission process, so the receiving end requires an equalizer to solve the problem caused by multi-path effects during signal transmission.

Please refer to FIG. 1. FIG. 1 shows a block diagram of a prior art receiver 100. The receiver 100 contains a direct down converter 110, an IQ imbalance compensating circuit 120, and an equalizer 130. After the incoming signal S1 is received by the direct down converter 110, the incoming signal S1 is transmitted in two different paths. Ideally, in the two paths, the incoming signal S1 is multiplied by g sin wt and g cos wt respectively by a mixer 116 and a mixer 118 (where g is the gain, w is the angular frequency). However, the phases of these two signals, g sin wt and g cos wt, are probably not orthogonal, and the gains of these two signals may also be different. In other words, the oscillating signals utilized by the direct down converter 110 are probably (g+α) sin wt and g cos(wt+θ), where α is the gain imbalance and θ is the phase imbalance. As a result, the two signals S1_I and S1_Q, which are respectively filtered by the LPF's 112 and 114, have an IQ imbalance issue. Typically, the IQ imbalance compensating circuit 120 generates a compensation coefficient through a calibration method for compensating the direct down converter 110. Once the calibration process of the IQ imbalance compensating circuit 120 has been achieved, the IQ imbalance compensating circuit 120 utilizes the same compensation coefficient to compensate all signals under all kinds of operating environments.

The compensated signals S1_I' and S1_Q' enter the equalizer 130 and are therefore equalized. In general, assuming that the IQ imbalance does not exist, a signal (T) transmitted by a transmitter, passing through a channel (H), and being received by a receiver (R), the transmitting signal T and the receiving signal R are therefore expressed by the following equation:

$$R(n)=\overline{H}(n) \times T(n) = (\overline{H}_i(n)+j\overline{H}_q(n)) \times (T_i(n)+jT_q(n))\ n \in 1, 2, 3, \ldots \quad \text{Eq. (1)},$$

where H represents a channel model. The above equation can also be expressed in the matrix form:

$$\begin{bmatrix} R_i(n) \\ R_q(n) \end{bmatrix} = \begin{bmatrix} \overline{H}_i & -\overline{H}_q \\ \overline{H}_q & \overline{H}_i \end{bmatrix} \begin{bmatrix} T_i \\ T_q \end{bmatrix}, \quad \text{Eq. (2)}$$

It is obvious that the two elements on the two respective diagonals of the channel model have a certain relation: the two elements on the main diagonal are the same, and the signs of the two elements on the other diagonal are opposite. Generally, the channel model H is not known in advance, so the equalizer 130 executes an adaptive algorithm to find the adaptive form of the channel model H. One frequently utilized adaptive algorithm is the Least-Mean-Square Algorithm. (Please refer to "Least-Mean-Square Adaptive Filters", Ch. 5 of "Adaptive Filter Theory", by Simon Haykin, 4th Ed., 2004, ISBN: 0-1304-8434-2.) As a result, the adaptive algorithm can be expressed as:

$$\begin{bmatrix} \overline{w}_i & -\overline{w}_q \\ \overline{w}_q & \overline{w}_i \end{bmatrix} = \begin{bmatrix} \overline{H}_i & -\overline{H}_q \\ \overline{H}_q & \overline{H}_i \end{bmatrix}^{-1}, \quad \text{Eq. (3)}$$

where $$\overline{w}_i(n+1) = \overline{w}_i(n) + u \cdot (e_i(n) \cdot \overline{R}_i(n) + e_q(n) \cdot \overline{R}_q(n))$$

$$\overline{w}_q(n+1) = \overline{w}_q(n) + u \cdot (e_q(n) \cdot \overline{R}_i(n) + e_i(n) \cdot \overline{R}_q(n)),$$

u being the step-size, $e_i$ and $e_q$ being errors, and $\overline{R}_i$ and $\overline{R}_q$ being data.

Similarly, in the adaptive matrix w, the two elements on the main diagonal are the same, and the signs of the two elements on the other diagonal are opposite.

The equalizer 130 takes the adaptive matrix was its equalization coefficient to equalize the signals S1_I' and S1_Q'. The required signals S1_I" and S1_Q" are then generated. Therefore, the equalizer 130 solves the multi-path problem occurring from signals passing through the channel.

Consequently, after the down-converted signals S1_I and S1_Q are processed by the IQ imbalance compensating circuit 120 and the equalizer 130, the IQ imbalance caused by the direct down converter 110 is compensated and the multi-path issue caused by the channel is also solved. However, as mentioned above, the IQ imbalance compensating circuit 120 utilizes a calibration method whose characteristic is that the IQ imbalance compensating circuit 120 calibrates only one time according to a specific frequency, and afterwards the IQ imbalance compensating circuit 120 utilizes the same compensation coefficient to compensate the signals of all kinds of frequencies in all operational conditions. In practical operation, a change in temperature may directly affect the direct down converter 110, so the IQ imbalance changes due to the change in temperature. In addition, the IQ imbalance also changes with respect to signals of different frequencies. As a result, a compensation circuit is required to compensate IQ imbalance of signals of different frequencies in all kinds of changes in the operational conditions, such as a temperature change.

SUMMARY OF THE INVENTION

One of the objectives of the present invention is to provide a method and a circuit for equalizing and compensating for IQ imbalances simultaneously to solve the above-mentioned problem.

One of the objectives of the present invention is to provide a method and a circuit which compensates the IQ imbalance of the signal and equalizes the signal. Hence the cost of the circuitry is lowered.

One of the objectives of the present invention is to provide a method and a circuit which utilizes the characteristics of the adaptive algorithm. The compensation can find more proper compensation coefficients according to different signal characteristics (e.g., different frequencies) and different operating environments (e.g., different temperatures). As a result, the IQ imbalance is more effectively compensated.

According to an embodiment of the claimed invention, a method for equalizing a signal is disclosed. The method comprises: down-converting an RF signal to generate a baseband signal; and utilizing an adaptive equalizer to process the baseband signal such that the baseband signal is equalized and an IQ imbalance of the baseband signal is compensated simultaneously.

According to another embodiment of the claimed invention, a circuit for equalizing and compensating IQ imbalance simultaneously is disclosed. The circuit comprises a down converter and an adaptive equalizer. The down converter down-converts an RF signal to generate a baseband signal. The adaptive equalizer, which is coupled to the down converter, receives the baseband signal and processes the baseband signal such that the baseband signal is equalized and an IQ imbalance of the baseband signal is compensated simultaneously.

According to another embodiment of the claimed invention, a method for equalizing a signal is disclosed. The method comprising: down-converting an RF signal to generate a baseband signal; generating a plurality of equalization coefficients, wherein the equalization coefficients correspond to channel response and IQ imbalance; and processing the baseband signal according to the equalization coefficients to equalize the baseband signal and compensate an IQ imbalance of the baseband signal.

These and other objectives of the present invention will no doubt become obvious to those of ordinary skill in the art after reading the following detailed description of the preferred embodiment that is illustrated in the various figures and drawings.

DETAILED DESCRIPTION

To generate a real time compensation coefficient for IQ imbalance with respect to signals of different frequencies in all kinds of operation conditions, the present invention performs signal equalization and IQ imbalance compensation simultaneously in one single equalizer based on the characteristic of the adaptive algorithm.

Figure 1:
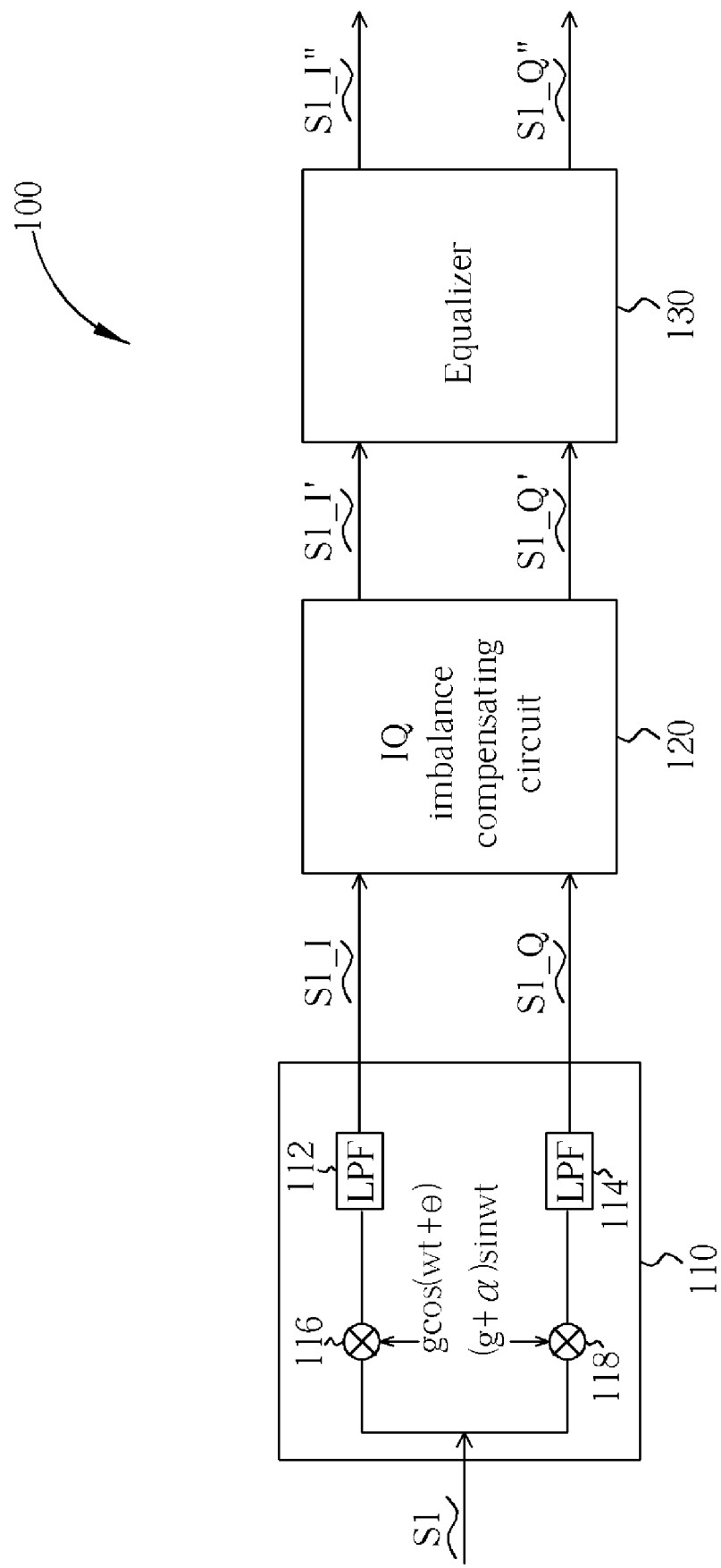
FIG. 1 shows a block diagram of a prior art receiver 100.
Figure 2:
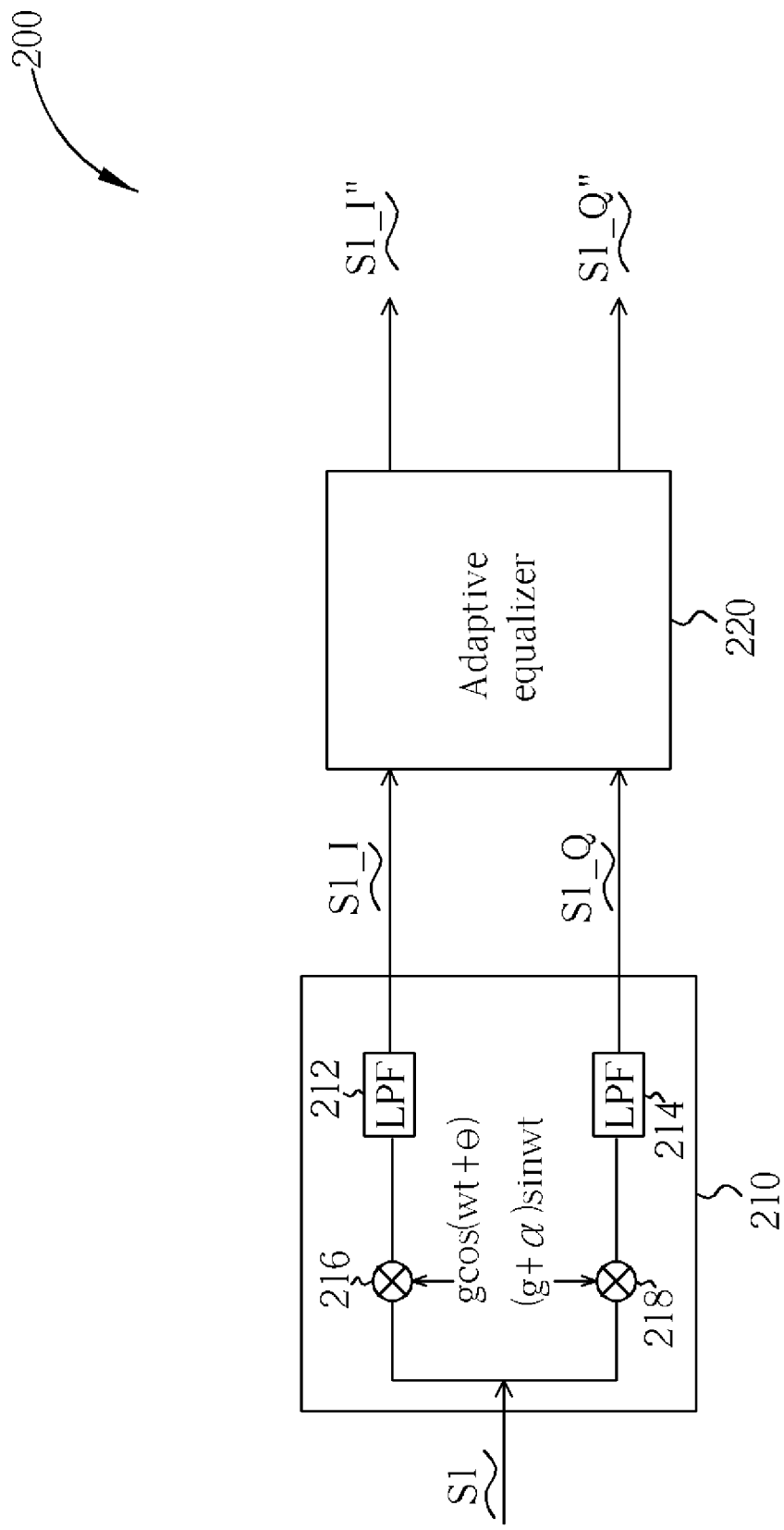
FIG. 2 is a diagram illustrating a receiver 200 according to the present invention.

Please refer to FIG. 2. FIG. 2 is a diagram illustrating a receiver 200 according to the present invention. The same as prior art, after the signal S1 passes through the direct down converter 210, two paths of signals, S1_I and S1_Q, are generated. Because of the imperfection of the direct down converter 210, the two signals, S1_I and S1_Q, which respectively pass through the low pass filters 212 and 214, have an IQ imbalance between each other. However, in the receiver 200, the two signals, S1_I and S1_Q, are equalized and IQ imbalance compensated at the same time by the adaptive equalizer 220.

As mentioned above, in the direct down converter 210, the two signals (g sin wt and g cos wt) utilized by the mixer 216 and the mixer 218 may have un-matched gains and non-orthogonal phases. Assuming that the gain imbalance is $\alpha$ and the phase imbalance is $\theta$, for example, one signal is $(g+\alpha)$ sin wt, and the other signal is g cos(wt+$\theta$), accordingly, the characteristic matrix of the direct down converter 210 is obtained as follows:

$$\begin{bmatrix} (1+\alpha)\cos(\theta/2) & -(1+\alpha)\sin(\theta/2) \\ -(1-\alpha)\sin(\theta/2) & (1-\alpha)\cos(\theta/2) \end{bmatrix}$$

Taking the multi-path issue of the channel and the IQ imbalance of the direct down converter 210 as a whole effect, the equation (2) can be further expressed as:

$$\begin{bmatrix} R_i(n) \\ R_q(n) \end{bmatrix} = \begin{bmatrix} \overline{H}_i & -\overline{H}_q \\ \overline{H}_q & \overline{H}_i \end{bmatrix} \begin{bmatrix} (1+\alpha)\cos(\theta/2) & -(1+\alpha)\sin(\theta/2) \\ -(1-\alpha)\sin(\theta/2) & (1-\alpha)\cos(\theta/2) \end{bmatrix} \begin{bmatrix} T_i \\ T_q \end{bmatrix}$$

$$= \begin{bmatrix} \overline{H}_{11} & \overline{H}_{12} \\ \overline{H}_{21} & \overline{H}_{22} \end{bmatrix} \begin{bmatrix} T_i \\ T_q \end{bmatrix} \qquad \text{Eq. 4}$$

Similarly, because the channel model H is unknown, the adaptive algorithm is adopted to find the adaptive matrix w' of the matrix $$\begin{bmatrix} \overline{H}_{11} & \overline{H}_{12} \\ \overline{H}_{21} & \overline{H}_{22} \end{bmatrix}$$

$$\begin{bmatrix} \overline{w}_{11}(n) & \overline{w}_{12}(n) \\ \overline{w}_{21}(n) & \overline{w}_{22}(n) \end{bmatrix} = \begin{bmatrix} \overline{H}_{11} & \overline{H}_{12} \\ \overline{H}_{21} & \overline{H}_{22} \end{bmatrix}^{-1} \qquad \text{Eq. (5)}$$

where, $$\overline{w}_{11}(n+1) = \overline{w}_{11}(n) + u \cdot e_i(n) \cdot \overline{R}_i(n)$$

$$\overline{w}_{12}(n+1) = \overline{w}_{12}(n) + u \cdot e_i(n) \cdot \overline{R}_q(n)$$

$$\overline{w}_{21}(n+1) = \overline{w}_{21}(n) + u \cdot e_q(n) \cdot \overline{R}_i(n)$$

$$\overline{w}_{22}(n+1) = \overline{w}_{22}(n) + u \cdot e_q(n) \cdot \overline{R}_q(n)$$

u being the step-size, $e_i$ and $e_q$ being errors, and $\overline{R}_i$ and $\overline{R}_q$ being data. In general, one frequently utilized adaptive algorithm is Least-Mean-Square (LMS) Algorithm. The more detailed description of LMS Algorithm can refer to "Adaptive Filter Theory, Chapter 5 Least-Mean-Square Adaptive Filters", SIMON HAYKIN, p 231-247, which is incorporated by reference. The Least-Mean-Square Algorithm serves as an example of the adaptive algorithm in the present invention, but is not meant to limit the scope of the present invention.

Equation (5) shows that the four elements of the adaptive matrix w' have the factors for compensating channel response and IQ imbalance. These four elements are derived independently and therefore independent to each other. Generally, the two elements on the main diagonal of the adaptive matrix w' are not definitely equal, and the absolute values of the two elements on the other diagonal of the adaptive matrix w' are not definitely equal. The values of these four elements are probably different. The adaptive equalizer 220 adopts the adaptive matrix w' as its equalization coefficient to compensate the IQ imbalance of the signals S1_I and S1_Q and solve the multi-path iswsue caused by the channel. In this embodiment, the adaptive equalizer 220 can be feed-forward linear equalizer (Ffe) or a decision feedback equalizer (DFE).

Figure 3:
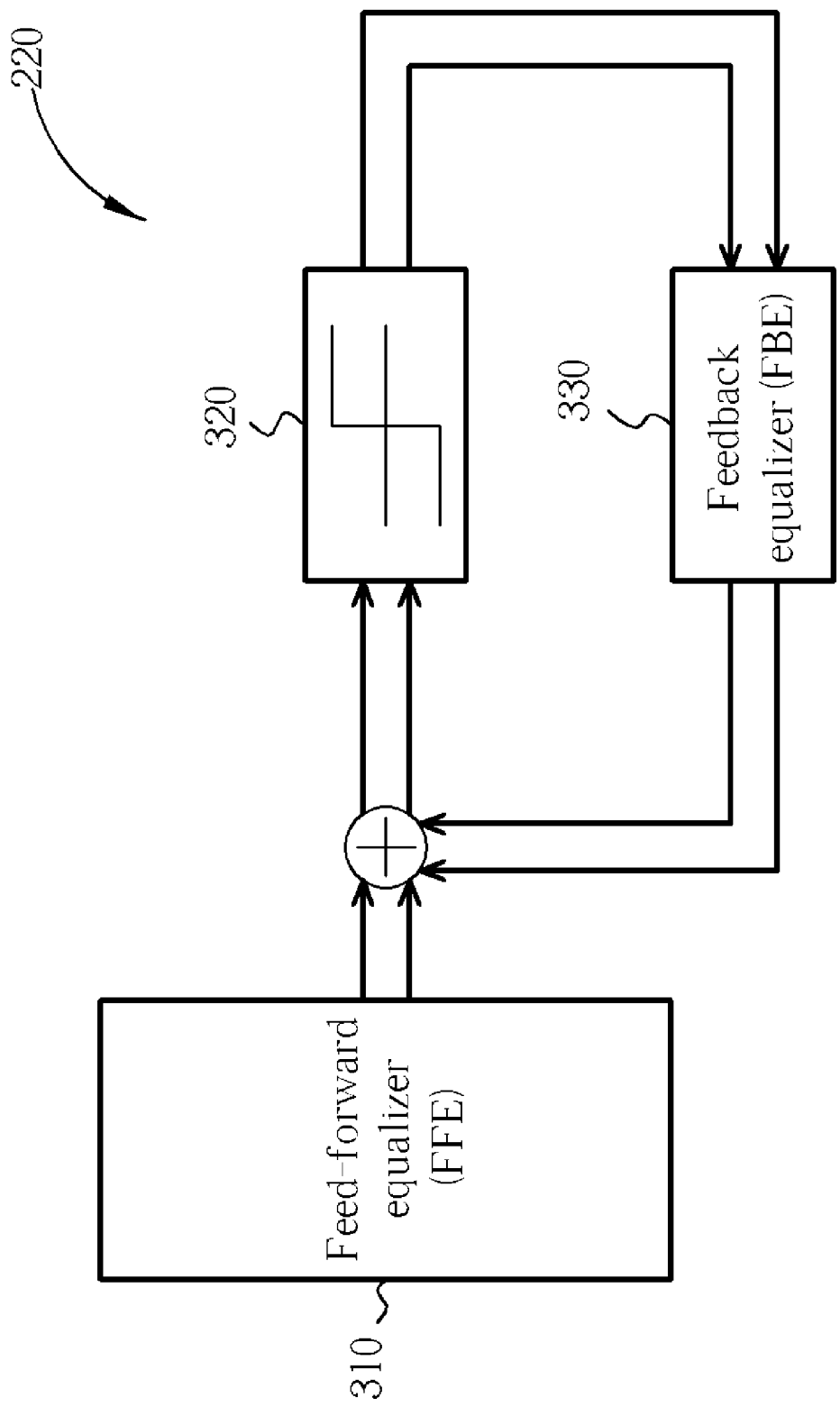
FIG. 3 shows a decision feedback equalizer according to an embodiment of the present invention.

Please refer to FIG. 3. FIG. 3 shows the decision feedback equalizer according to an embodiment of the present invention. This embodiment serves as an example of the adaptive equalizer in the present invention, but is not meant to limit the scope of the present invention. The decision feedback equalizer comprises a feed-forward equalizer (FFE) 310, a slicer 320, and a feedback equalizer (FBE) 330. The feed-forward equalizer 310, the slicer 320, and the feedback equalizer 330 are well known to those skilled in the art, so the description is omitted for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for equalizing a signal, comprising:
   down-converting an RF signal to generate a baseband signal; and
   utilizing an adaptive equalizer to process the baseband signal such that the baseband signal is equalized and an IQ imbalance of the baseband signal is compensated simultaneously;
   generating a plurality of equalization coefficients to process the baseband signal, wherein each equalization coefficient is a 2×2 matrix, and two elements on two respective diagonals of the 2×2 matrix are not equal;
   wherein the adaptive equalizer processes the baseband signal under a time domain.

2. The method of claim 1, wherein the adaptive equalizer is one of a feed-forward equalizer (FFE) and a decision feedback equalizer (DFE).

3. The method of claim 1, wherein the RF signal is a digital TV signal.

4. The method of claim 1, wherein the adaptive equalizer executes a least-mean-square (LMS) algorithm.

5. The method of claim 1, wherein the adaptive equalizer comprises a plurality of equalization coefficients for compensating channel response and IQ imbalance.

6. A circuit for equalizing and compensating IQ imbalance simultaneously, comprising:
   a down converter for down-converting an RF signal to generate a baseband signal; and
   an adaptive equalizer coupled to the down converter for receiving the baseband signal and processing the baseband signal such that the baseband signal is equalized and an IQ imbalance of the baseband signal is compensated simultaneously;
   wherein the adaptive equalizer processes the baseband signal according to a plurality of equalization coefficients, wherein each equalization coefficient is a 2×2 matrix, and two elements on two respective diagonals of the 2×2 matrix are not equal; and
   wherein the adaptive equalizer processes the baseband signal under a time domain.

7. The circuit of claim 6, wherein the adaptive equalizer is a feed-forward linear equalizer (FFE) or a decision feedback equalizer (DFE).

8. The circuit of claim 6, wherein the RF signal is a digital TV signal.

9. The circuit of claim 6, wherein the adaptive equalizer executes a least-mean-square (LMS) algorithm.

10. The circuit of claim 6, wherein the adaptive equalizer comprises a plurality of equalization coefficients, the equalization coefficients correspond to channel response and IQ imbalance.

11. A method for equalizing a signal, comprising:
    down-converting an RF signal to generate a baseband signal;
    generating a plurality of equalization coefficients, wherein the equalization coefficients correspond to channel response and IQ imbalance; and
    processing the baseband signal according to the equalization coefficients to equalize the baseband signal and compensate an IQ imbalance of the baseband signal;
    wherein each equalization coefficient is a 2×2 matrix, and two elements on two respective diagonals of the 2×2 matrix are not equal; and
    wherein the step of processing the baseband signal is performed under a time domain.

12. The method of claim 11, wherein the down-converting step is a direct down converting step.

13. The method of claim 11, wherein the RF signal is a digital TV signal.

14. The method of claim 11, wherein the down-converting step further comprises:
    filtering out a noise of the baseband signal.

15. The method of claim 11, further comprising:
    executing an adaptive algorithm to generate the equalization coefficients.

16. The method of claim 15, wherein the adaptive algorithm is a least-mean-square (LMS) algorithm.

* * * * *